United States Patent [19]

Suzuki et al.

[11] Patent Number: 5,802,217
[45] Date of Patent: Sep. 1, 1998

[54] IMAGE READING APPARATUS FOR OBTAINING A SHADING CORRECTION FACTOR USING TWO WHITE REFERENCE MEMBERS

[75] Inventors: Yasumichi Suzuki, Yokohama; Masanori Yamada, Kawasaki; Eiji Ohta, Fujisawa, all of Japan

[73] Assignee: Canon Kabushiki Kaisha, Tokyo, Japan

[21] Appl. No.: 541,591

[22] Filed: Oct. 10, 1995

Related U.S. Application Data

[63] Continuation of Ser. No. 125,813, Sep. 24, 1993, abandoned.

[30] Foreign Application Priority Data

Sep. 28, 1992 [JP] Japan .................... 4-258207

[51] Int. Cl.$^6$ .................... G06K 9/40; H04N 1/40
[52] U.S. Cl. .................... 382/274; 358/461
[58] Field of Search .................... 358/461; 382/274, 382/272, 254

[56] References Cited

U.S. PATENT DOCUMENTS

| | | | |
|---|---|---|---|
| 4,647,961 | 3/1987 | Kammoto et al. | 358/75 |
| 4,870,501 | 9/1989 | Yoshida | 358/461 |
| 4,888,492 | 12/1989 | Arimoto | 250/578 |
| 4,922,335 | 5/1990 | Outa et al. | 358/80 |
| 4,969,053 | 11/1990 | Outa et al. | 358/458 |
| 5,062,144 | 10/1991 | Murakami | 382/52 |
| 5,099,341 | 3/1992 | Nosaki et al. | 358/461 |
| 5,115,327 | 5/1992 | Ishima | 358/461 |
| 5,122,969 | 6/1992 | Seshimoto et al. | 364/571.01 |
| 5,146,351 | 9/1992 | Maehara | 358/448 |
| 5,214,520 | 5/1993 | Miyazawa | 358/461 |
| 5,282,064 | 1/1994 | Yamada | 358/487 |
| 5,371,613 | 12/1994 | Arimoto et al. | 358/461 |

FOREIGN PATENT DOCUMENTS

| | | |
|---|---|---|
| 59-045755 | 3/1984 | Japan . |
| 02297533 | 12/1990 | Japan . |
| 2261793 | 5/1993 | United Kingdom . |

*Primary Examiner*—Yon J. Couso
*Assistant Examiner*—Ha Tran Nguyen
*Attorney, Agent, or Firm*—Fitzpatrick,Cella, Harper & Scinto

[57] ABSTRACT

An image reading apparatus comprises a reader for photoelectrically reading an image, a first reference member to be used for the measurement of irregularity of an output signal from the reader, a second reference member having density data indicating a density thereof recorded thereon, a correction unit for correcting irregularity of an image signal derived by reading an image of a document sheet by the reader based on a first reference signal derived by reading the first reference member by the reader, and a compensation unit for compensating the irregular correction operation by the correction unit based on a second reference signal derived by reading the second reference member by the reader and the density of the second reference member derived by reading the density data.

9 Claims, 6 Drawing Sheets

FIG. 6
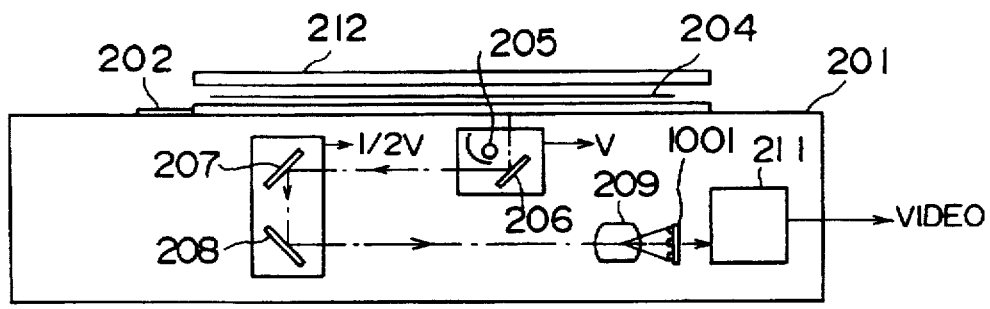
FIG. 7A
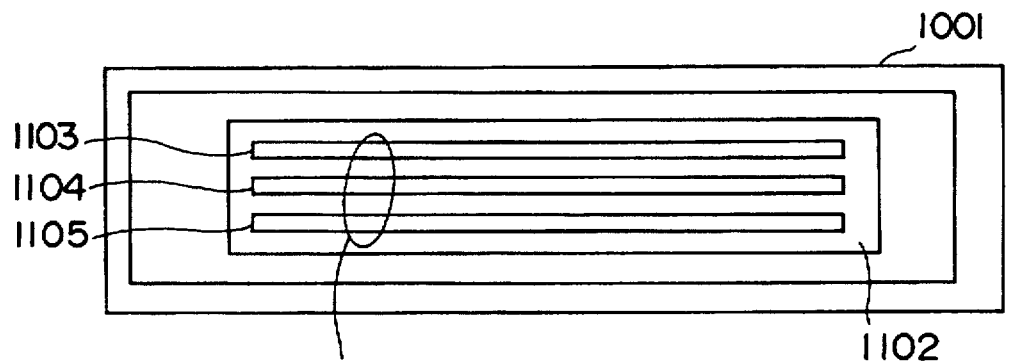
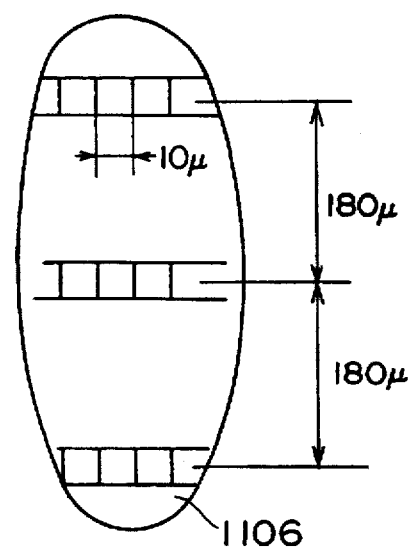
FIG. 7B

IMAGE READING APPARATUS FOR OBTAINING A SHADING CORRECTION FACTOR USING TWO WHITE REFERENCE MEMBERS

This application is a continuation of application Ser. No. 08/125,813 filed Sep. 24, 1993, now abandoned.

BACKGROUND OF THE INVENTION

1. Field of the Invention

The present invention relates to an image reading apparatus used in a facsimile apparatus or a digital reproduction apparatus and more particularly to an image reading apparatus which photoelectrically reads an image of a document sheet.

2. Related Background Art

In a digital reproducing apparatus or a facsimile apparatus, an image reading apparatus having a photo-electric transducer such as a CCD is used to photo-electrically read an image of a document sheet. In such an image reading apparatus, a processing function called shading correction is provided in order to eliminate a scatter in a read output level due to a variance of sensitivity of an intensity of exposure light to the document sheet and a variance of sensitivity of the photo-electric transducer and uniformly read an image density.

In a prior art shading correction, a standard white plate of a known density is provided outside a document sheet read area, and the standard white plate is read prior to the reading of the document sheet and the read signal is stored in a memory. The scatter of the read output level can be detected by the signal stored in the memory. Accordingly, in order to eliminate the detected scatter, the shading correction is made to the read data based on the data stored in the memory, when the document sheet is read.

In general, the read apparatus electrically main-scans the document sheet by using a linear CCD to read it and sub-scans it by mechanically moving the read line of the CCD transversely to the direction of the main scan. The standard white plate is located at a start of read position in the direction of sub-scan.

In the shading correction, a multiplication factor to render the light intensity data from the standard white plate for each pixel stored in the memory to a light intensity corresponding to the known density of the standard white plate is determined for each pixel and it is stored in the memory.

When the document sheet is read, the multiplication factor corresponding to the read pixel is read from the memory and it is multiplied to the document sheet read signal to effect the shading correction.

In the prior art, since the document sheet is mounted on a platen glass, the document sheet read signal is one transmitted through the platen glass. On the other hand, the standard white plate is formed by applying it on a thin metal plate and it is not always arranged at the same level as that of the document sheet but it is in many cases at a level of the bottom surface of the platen glass. Accordingly, the standard white plate is located closer to an illumination lamp than the document sheet is.

In addition, while the document sheet is covered by the platen glass, the applied read plane of the standard white plate is exposed to the light source and the CCD sensor. As a result, in a long time use, the standard white plate exposed to the illumination significantly fades and the density level greatly deviates from the initially set level.

Further, the standard white plate is materially contaminated by the deposition of dusts and oil vapor.

As a result, in spite of the fact that the shading correction is made on the assumption that the standard white plate has a known density, the signal derived by reading the standard white plate is not proper one due to a difference in the optical path lengths from the surface of the document sheet and a change in the density of the standard white plate. Consequently, the shading-corrected document sheet read signal shifts from a proper level. As a result, the document sheet read signal is weakened or strengthened, and in a color reading apparatus, a balance of the R, G and B color resolution signals is lost and hue and gray balance cannot be guaranteed.

In the light of the above problems, the assignee of the present invention has proposes a construction to compensate the shading operation using the standard white plate by a reference white data derived by reading a copy sheet as disclosed in U.S. Pat. No. 4,888,492.

However, in the construction of U.S. Pat. No. 4,888,492, the copy sheet to be used for the compensation is not limited to one type and hence the density of the copy sheet used is not fixed. As a result, the compensation of the shading operation is not uniquely done. Accordingly, satisfactory compensation operation is not always attained.

SUMMARY OF THE INVENTION

It is an object of the present invention to provide an image reading apparatus which always attain satisfactory shading correction to correct the irregularity of the image read signal.

It is another object of the present invention to provide an image reading apparatus which attains satisfactory shading correction even if the standard white plate used for the shading correction no longer has a proper density due to aging.

It is other object of the present invention to provide an image reading apparatus which compensates for the shading correction to attain satisfactory shading correction.

In accordance with the present invention, there is provided an image reading apparatus comprising:
  read means for photo-electrically reading an image;
  a first reference member to be used for the measurement of irregularity of an output signal from said read means;
  a second reference member having density data indicating a density thereof recorded thereon;
  correction means for correcting irregularity of an image signal derived by reading an image of a document sheet by said read means based on a first reference signal derived by reading said first reference member by said read means; and
  compensation means for compensating the irregular correction operation by said correction means based on a second reference signal derived by reading said second reference member by said read means and the density of said second reference member derived by reading said density data.

In accordance with the present invention there is further provided an image reading apparatus comprising:
  read means for photo-electrically reading an image;
  a first reference member to be used for the measurement of irregularity of an output signal from said read means;
  a second reference member having density data indicating a density thereof recorded thereon;
  determination means for determining a target value of the correction of the irregularity of an output signal of said read means based on a second reference signal derived by reading said second reference member by said read means and a density of said second reference member derived by reading said density data; and correction means for correcting the irregularity of the image signal derived by reading an image of a document sheet by said read means based on a first reference signal derived by reading said first reference member by said read means and the target value determined by said determination means.

The above and other objects and advantages of the present invention will be apparent from the following description made in conjunction with the accompanying drawings.

BRIEF DESCRIPTION OF THE DRAWINGS

FIG. 6 shows a configuration of a reading apparatus, FIG. 7 shows a configuration of a color CCD.

DETAILED DESCRIPTION OF THE PREFERRED EMBODIMENTS

Figure 2:
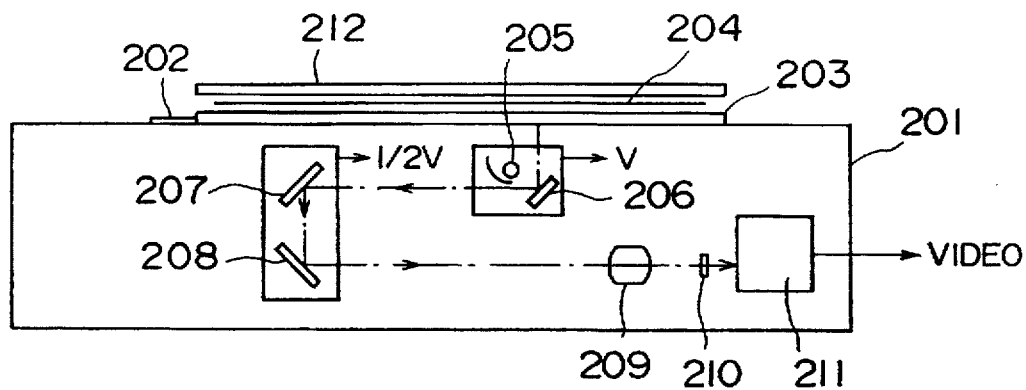
FIG. 2 shows a configuration of a reading apparatus.

FIG. 2 shows an image reading apparatus of the present invention.

Numeral 201 denotes an image scanner which reads a document sheet and digitally processes a signal. The image scanner has a function of reading and recognizing a bar code.

In the image scanner 201, numeral 202 denotes a standard white plate. A document sheet 204 mounted on a document sheet table glass (hereinafter platen) 203 and secured by a cover 212 is illuminated by a lamp 205. A reflected light from the document sheet 204 is directed to mirrors 206, 207 and 208 and directed to a line sensor (hereinafter CCD) 210 through a lens 209. An output of the CCD 210 is sent to a signal processing unit 211 as a document sheet read electrical signal.

The lamp 205 and the mirror 206 are mechanically moved at a velocity v and the mirrors 207 and 208 are mechanically moved at a velocity v/2 normally to the direction of electrical scan of the CCD line sensor to scan the entire surface of the document sheet.

In the signal processing unit 211, the shading correction is made to the read signal to produce a video signal.

Figure 1:
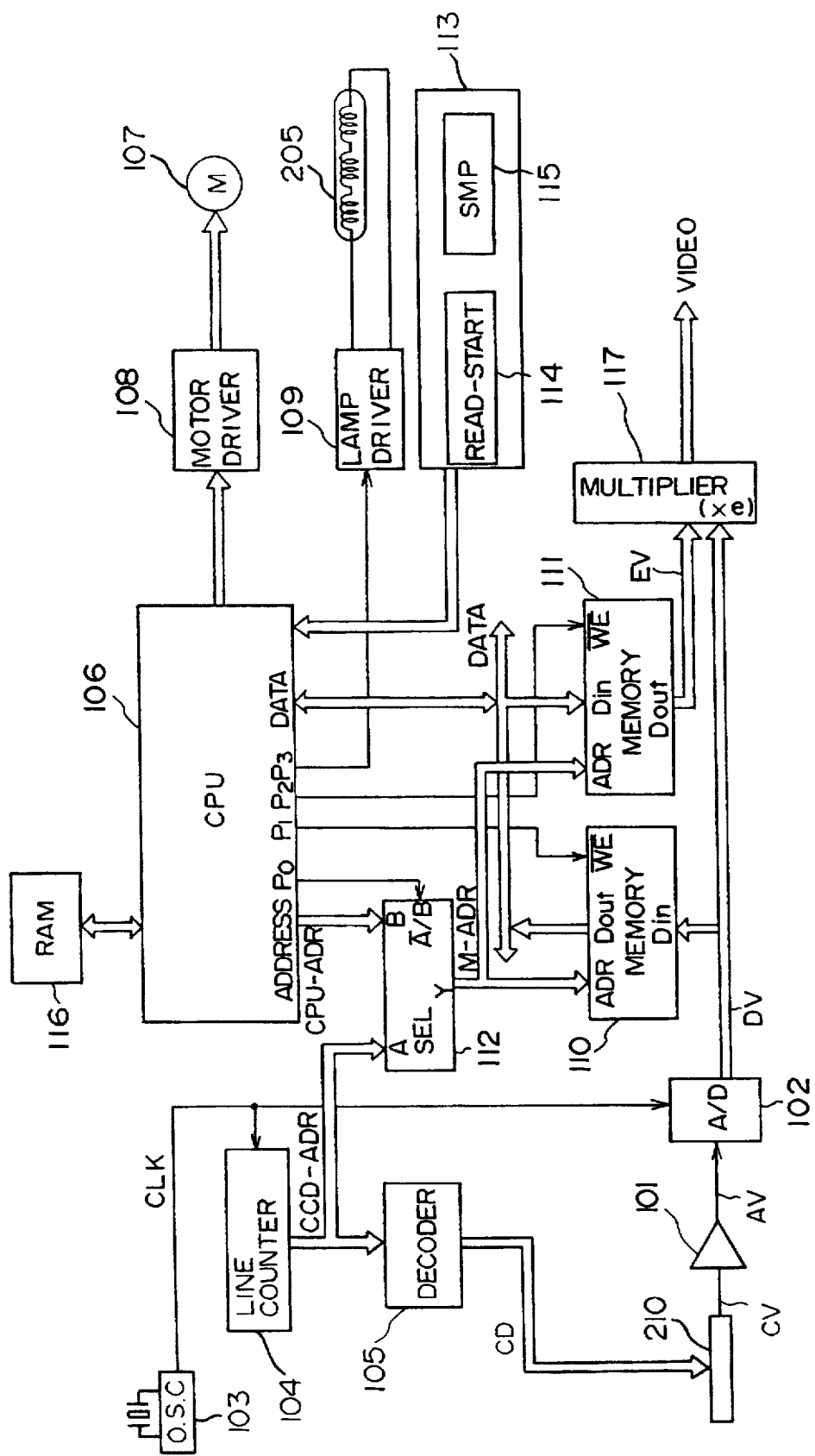
FIG. 1 shows a signal processing circuit in an embodiment of the present invention.

FIG. 1 shows a configuration of the signal processing unit 211.

A read signal CV from the CCD 210 is amplified by an amplifier 101 and it is converted to an 8-bit digital video signal DV by an A/D converter 102. Numeral 103 denotes an oscillator which generates a pixel clock CLK of the CCD 210. Numeral 104 denotes a line counter which produces a CCD address CCD-ADR for identifying a read pixel of the CCD 210.

In the present embodiment, since the CCD having approximately 5,000 pixels of photo-sensing elements in the direction of main scan is used, the CCD-ADR repeatedly counts from 0 to 4,999 for each main scan.

Numeral 105 denotes an address decoder which decodes the CCD-ADR signal to produce a CD signal such as a shift pulse for driving the CCD, a reset pulse and a transfer clock pulse.

Numeral 106 denotes a control CPU which controls a motor 107 for driving an optical system (lamp 205 and mirrors 206, 207 and 208) in the direction of sub-scan, through a motor driver 108. A lamp driver 109 turns on and off the document sheet illumination lamp 205. External memories 110 and 111 are accessed through an address bus CPU-ADR and a data bus DATA. A function to recognize a bar code read output from the CCD 210 is provided.

Numeral 112 denotes an address selector which selects an address to be supplied to memories 110 and 111.

Numeral 110 denotes a first memory which reads in one line of data from the CCD 210, and numeral 111 denotes a second memory which stores the multiplication factors of the pixels from the CPU 106.

Numeral 117 denotes a multiplier which multiplies a digital image signal DV from the CCD 210 through the A/D converter 102 with the multiplication factor from the second memory 111 to produce a shading-corrected image signal Video.

Numeral 113 denotes a console panel which includes a document sheet read start key 114 and a standard white plate density measurement key 115, as well as ten-key and indicators as required.

<Document Sheet Read Operation>

When the CPU 106 detects the depression of the read start key 114, it turns on the illumination lamp 205 and moves the first mirror 206 to the position of the standard white plate 202. It then renders the signals $P_0$ and $P_1$ to the L-level to write one line of read signal of the standard white plate 202 from the CCD 210 to the addresses 0 to 4,999 of the memory 110 in accordance with the CCD-ADR from the line counter 104. Then, it renders the signal $P_1$ to the H-level to terminate the writing and renders the signal $P_0$ to the H-level to read the data at the addresses 0 to 4,999 of the memory 110 one at a time in accordance with the CPU-ADR and sends them to the CPU 106 through the data bus DATA.

It is assumed that the read data from the address x is Bx. In the shading correction, the reading Bx from the standard white plate is corrected to the light intensity conversion value Bd of the known standard white plate density. Thus, the CCD read data for the address x is multiplied by Bd/Bx.

On the other hand, the multiplier 117 is a known digital multiplier. When an 8-bit EV signal is 0, the DV signal is multiplied by the factor of 0, when EV is 128, it is multiplied by the factor of 1, and when EV is 255, it is multiplied by the factor of (1 +127/128).

Namely, the multiplication factor e is equal to EV/128. Accordingly, the CPU 106 renders the signal $P_2$ to the L-level to write EVx corresponding to e =Bd/Bx to the address x of the memory 111.

Namely, EVx =128×e =128×(Bd/Bx)

It is repeated for the read signals of the addresses 0 to 4,999 of the memory 110 and the CPU 106 writes the resulting EVx into the addresses 0 to 4,999 of the memory 111 as the multiplication factors for the respective pixels of the CCD 210.

In the subsequent reading of the document sheet, the CPU 106 again renders the signal $P_0$ to the L-level and the signal $P_2$ to the H-level to output the multiplication factors for the respective pixels of the CCD 210 from the memory 111 in accordance with the CCD-ADR. The multiplication factors are multiplied by the multiplier 117 to the image signals DV outputted by reading the document sheet so that the shading correction is made, and the optical system is advanced at the predetermined velocity to read the entire document sheet.

In this manner, the shading correction is made to the document sheet image signal by using the read signal of the standard white plate. However, as described above, the density of the standard white plate may not be proper. An operation to attain proper shading correction even in such a case is explained below.

<Standard White Plate Density Measurement Mode>

Figure 3:
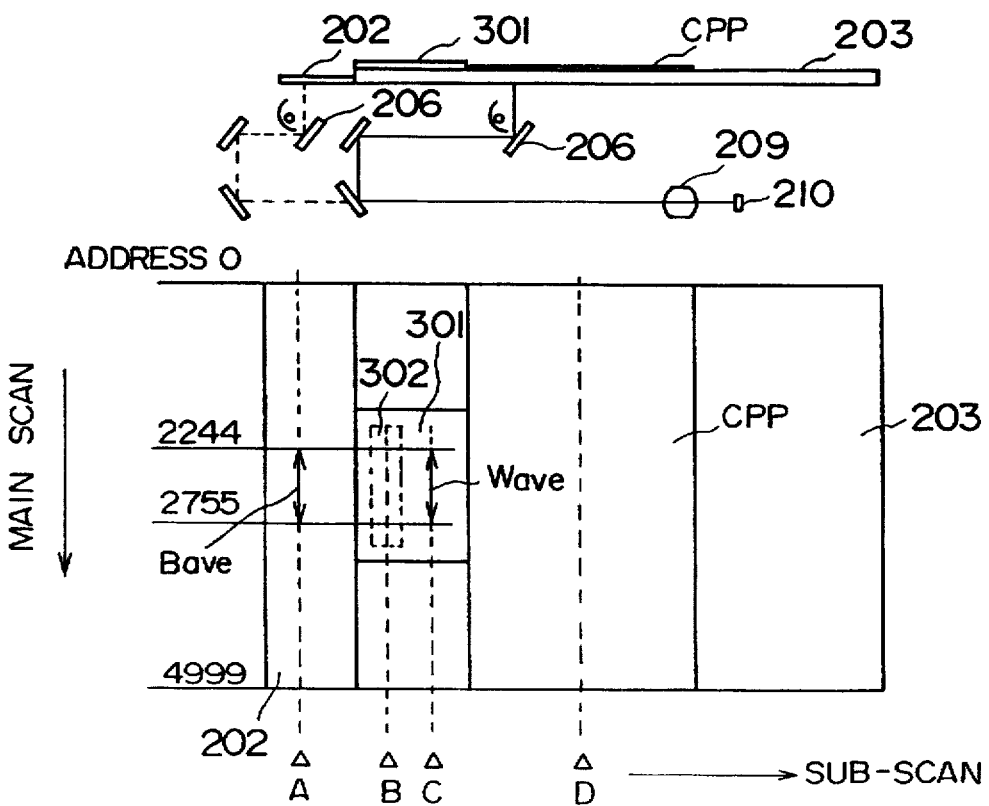
FIG. 3 illustrates the measurement of a density of a standard white plate.
Figure 4:
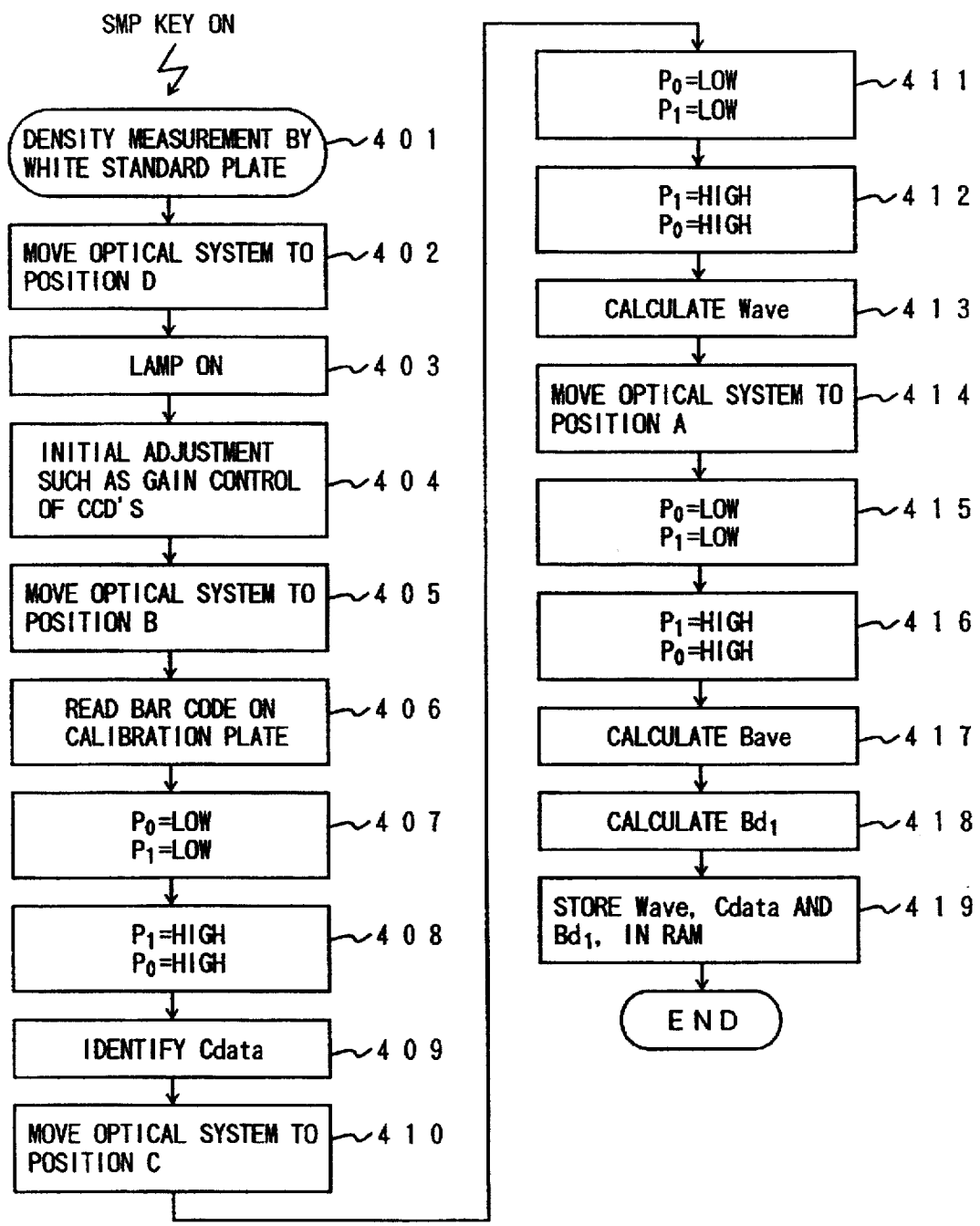
FIG. 4 shows a control flow chart of the standard white plate density measurement.

For the correction operation, it is necessary to detect an actual density of the standard white plate. FIG. 3 shows a view relating to the measurement of the density of the standard white plate 202, and FIG. 4 shows a flow chart of the measurement.

In FIG. 3, numeral 301 denotes a calibration plate mounted on the platen 203 and numeral 302 denotes a bar code applied to the calibration plate 301. CPP denotes a reference white document sheet which is a conventional white copy sheet.

The calibration plate 301 is first explained. The calibration plate 301 has white paint applied on a plate such as a metal plate and has a constant density. When the calibration plate is manufactured in a factory, a brightness thereof is precisely measured by a brightness/density measurement device (for example, Macbeth device) and the bar code 302 representing the measured brightness is applied to a predetermined position on the calibration plate 301. The calibration plate must be manufactured very precisely but it is unavoidable that an error is included in the manufacturing process and a yield is lowered and a cost increases if a severe precision is required. Accordingly, the calibration plate manufactured with a certain tolerance is precisely measured to compensate for an error specific to each calibration plate 301. The calibration plate 301 is stored while it is prevented from being contaminated when it is not used.

In the standard white plate density measurement mode, an operator such as a service man mounts the calibration plate 301 at a predetermined position shown in a plan view of FIG. 3.

The operator mounts a copy sheet which is normally used on the platen glass 203 together with the calibration plate 301. The copy sheet CPP is for adjusting an offset gain of the sensor 210 and it is used to adjust the channels of the chips when the CCD 210 has a plurality of CCD chips arranged in zig-zag form.

The operator mounts the calibration plate 301 and the copy sheet CPP on the platen 203 and depresses the SMP key 115.

When the CPU 106 detects the depression of the SMP key 115, the CPU 106 enters into the measurement mode of the standard white plate 202.

This is explained with reference to a flow chart of FIG. 4. In the density measurement mode of the standard white plate 202 shown in FIG. 4, the density Bdl of the standard white plate 202 is measured based on the read data from the standard white plate 202 and the read data of the calibration plate 301.

The CPU 106 first drives the optical system 106 to move the mirror 206 from the read position A of the standard white plate 202 to a point D shown in FIG. 3 (step 402). It then turns on the lamp 205 (step 403).

One line of data of the copy sheet CPP is read by the CCD 210 to make various initial settings. Where the CCD 210 comprises a plurality of chips, gains of channels are adjusted to adjust among the channels (step 404).

The CPU 106 then drives the optical system to move the mirror 206 from the standard white plate 202 to a point B shown in FIG. 3 (step 405). The CCD 210 reads the bar code 302 applied to the calibration plate 301 (step 406).

Then, the signal $P_0$ is rendered to the L-level to supply the CCD-ADR to the memory 110 and the signal $P_1$ is rendered to the L-level to write one line of read signal DV including the read signal of the bar code 302 from the CCD 210 to the memory 110 (step 407).

Then, the CPU 106 renders the signals $P_0$ and $P_1$ to the H-level to read the content of the first memory 110. It is then binarized with a predetermined threshold level to decode the content Cdata of the bar code (step 409). The Cdata represents the brightness of the calibration plate 301 at the manufacture thereof.

Then, the CPU 106 drives the optical system to move the mirror 206 to a point C of FIG. 3 (step 410). At this position, the brightness of the calibration plate outside of the bar code area (the light intensity conversion value of the density of the calibration plate 301) is read.

Then, the signal $P_0$ is rendered to the L-level to supply the CCD-ADR to the memory 110 and renders the signal $P_1$ to the L-level to write one line of read signal DV including the calibration plate 301 outputted from the CCD 210 is written into the memory 110 (step 411).

Then, the CPU 106 renders the signals $P_0$ and $P_1$ to the H-level to read the content of the first memory 110 into the addresses 2,244 to 2,755 (step 412).

The address 2,500 corresponds a substantially a center position of the document sheet platen 203 in the direction of main scan, and a mean value Wave of the read data of 512 pixels around the center of the calibration plate 301 mounted at the center, that is from the address 2,244 to the address 2,755 is determined (step 413).

Then, the CPU 106 drives the optical system again to bring the mirror 206 to the position A of the standard white plate 202 (step 414). The signals $P_1$ and $P_2$ are rendered to the L-level (step 415) to write one line of image signal DV from the CCD 210 which reads the standard white plate 202, into the memory 110. The signals $P_0$ and $P_1$ are returned to the H-level and a mean value Bave of the addresses 2,244 to 2,755 of the memory 110 is determined as it is for the calibration plate 301 (steps 416 and 417).

Since Bave is the reading from the standard white plate 202 by the same pixels as the CCD pixels from which Wave was determined, a ratio of Bave and Wave is equal to a ratio of the density of the standard white plate 202 and the light intensity conversion value of the density of the calibration plate 301.

The output DV of the A/D converter 102 is an 8-bit multi-level light intensity signal, and the CPU 106 determines the density of the standard white plate 202 based on the signals Cdata, Wave and Bave.

It first determines an exact value of the light intensity conversion value (like Cdata) of the density of the standard white plate 202 based on the ratio of the light intensity conversion value Cdata of the calibration plate 301 at the time of manufacture and the Wave. It further normalizes the exact value of the light intensity conversion value of the density of the standard white plate 202 to a level 255 by the 8-bit multi-level signal so that the light intensity conversion value Bdl of the density of the standard white plate 202 is equal to $255 \times (Bave \times Cdata/Wave)$.

When the shading correction is to be made based on the data derived by using the calibration plate 301, the shading correction is made by using the density of the calibration plate 301 as a target. Namely, the shading correction is made assuming that the density of the calibration plate 301 is complete white. However, since the document sheet is a paper, it is preferable to use a background color of the paper as the complete white when the shading correction is made. A conventional copy paper has very stable density and reflection factor immediately after it is unpacked. Thus, in order to compensate a difference between the measurement Cdata of the colormeter for the calibration plate 301 and the data SKdata measured by the colormeter for the copy sheet, Bdl is set to 255×(Bave×Cdata/Wave)×k, where k is a correction factor. SKdata is normally 285 and k is a constant determined thereby.

Since the standard white plate 202 is substantially uniformly painted, the density Bdl determined by using the center 251 pixels is applicable to the entire surface of the standard white plate 202.

The CPU 106 determines the Bdl (step 415) and stores the values of Wave, Cdata, Bave and Bdl in the non-volatile battery-backup RAM 116.

The shading correction is made in the reading of the actual document sheet to the data derived in the standard white plate density measurement mode which is executed by the SMP key 115 by setting Bd=Bdl.

Accordingly, even if the standard white plate does not have a proper density by some reason, the proper shading correction is attained by using the read signal of the standard white plate.

In the above embodiment, the calibration plate is provided separately from the image scanner 201 so that the operator mounts it on the platen. If a position which is at the same distance as that from the document sheet surface to the illumination lamp and which is not affected by the change in the density of the illumination lamp and not contaminated can be secured in the image scanner, the calibration plate may be built in the image scanner.

In the above embodiment, a monochromatic image scanner is used. An embodiment of the present invention which uses a color reader is explained below.

FIG. 6 shows an embodiment which uses a color reader which is basically identical to that shown in FIG. 2 except that a photo-electric conversion element 210 is a 3-line R, G, B monolithic CCD 1001 for reading a color image. A configuration of the CCD 1001 is shown in FIG. 7.

CCD sensors 1103, 1104 and 1105 are arranged on one chip 1102 parallelly at a pitch of 180 μm. A red (R) filter is applied to the sensor 1103, a green (G) filter is applied to the sensor 1104, and a blue (B) filter is applied to the sensor 1105.

The number of pixels of each CCD sensor is approximately 5,000 and it can read a longitudinal direction of 297 mm of a size A4 document sheet at a resolution of 400 dots/inch. Numeral 1106 denotes an enlarged view of the sensors in which one pixel width is 10 μm and a sensor-to-sensor distance is 180 μm.

Figure 5:
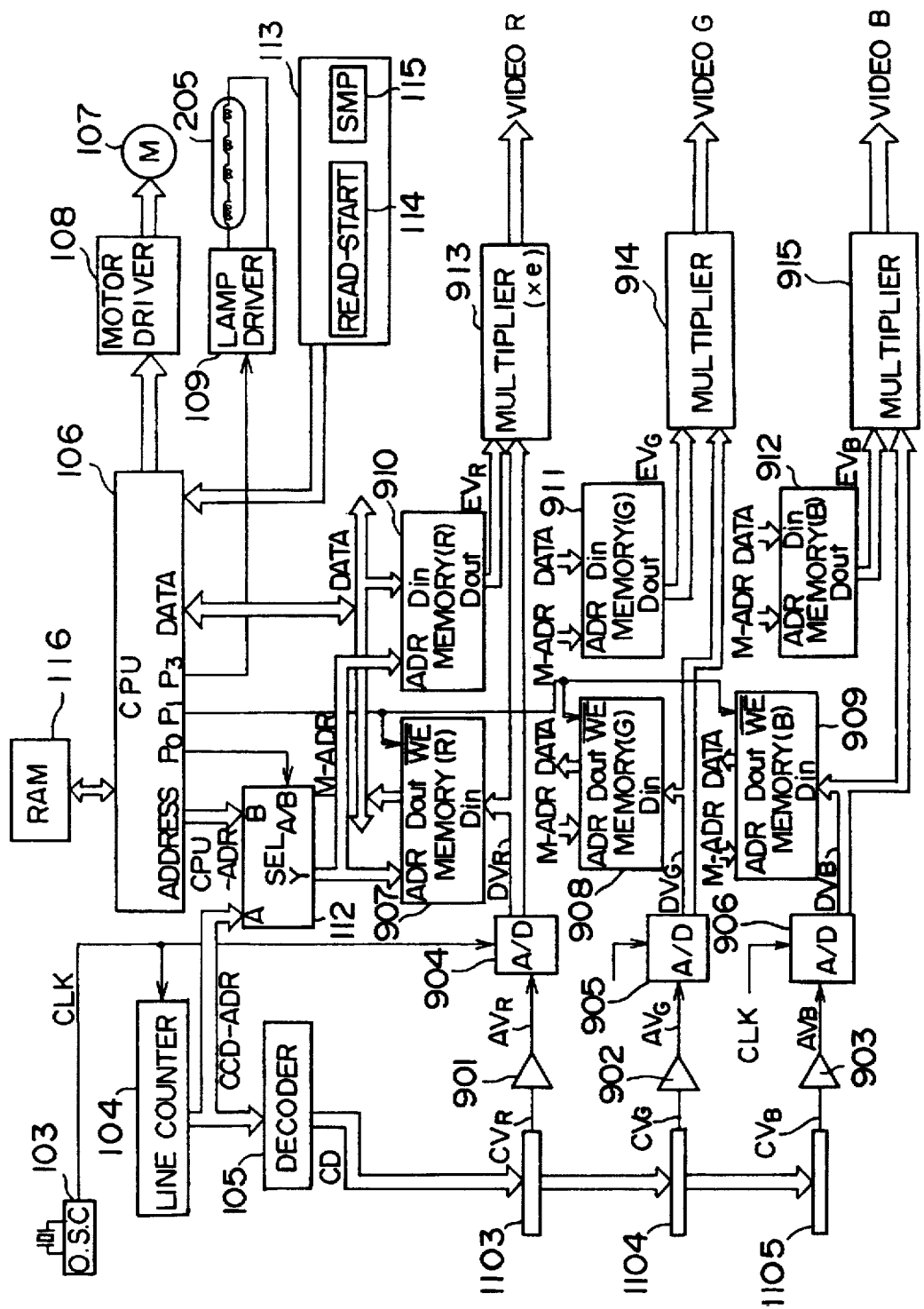
FIG. 5 shows a configuration of a signal processing circuit.

FIG. 5 shows a signal processing unit of the present embodiment. It is basically of the same configuration as the embodiment of FIG. 1, and since three channels of CCD are provided, three channels of amplifiers 901–903, A/D converters 904–906, first memories 907–909, second memories 910–912 and multipliers 913–915 are provided.

The read operation of the document sheet is basically identical to that of the previous embodiment, and the shading correction which is similar to that conducted for the monochromatic image scanner described above is independently conducted for each of the color signals R, G and B.

The signals derived by reading the standard white plate 202 by the sensors 1103–1105 having the filters R, G and B applied thereto are stored in the first memories 907–909. The CPU 106 sequentially reads the stored signals from the first memories 907–909 to determine multiplication factors $EV_R$, $EV_G$ and $EV_B$. They are stored in the second memories 910–912. The multiplication factors may be calculated in a time division fashion for each color or they may be parallelly calculate.

The target values Bd for the shading correction of the read signals from the standard white plate 202 are independently set for three colors R, G and B by using the calibration plate having the bar code in the same manner as that of the previous embodiment to produce BdR, BdG and BdB.

Figure 8:
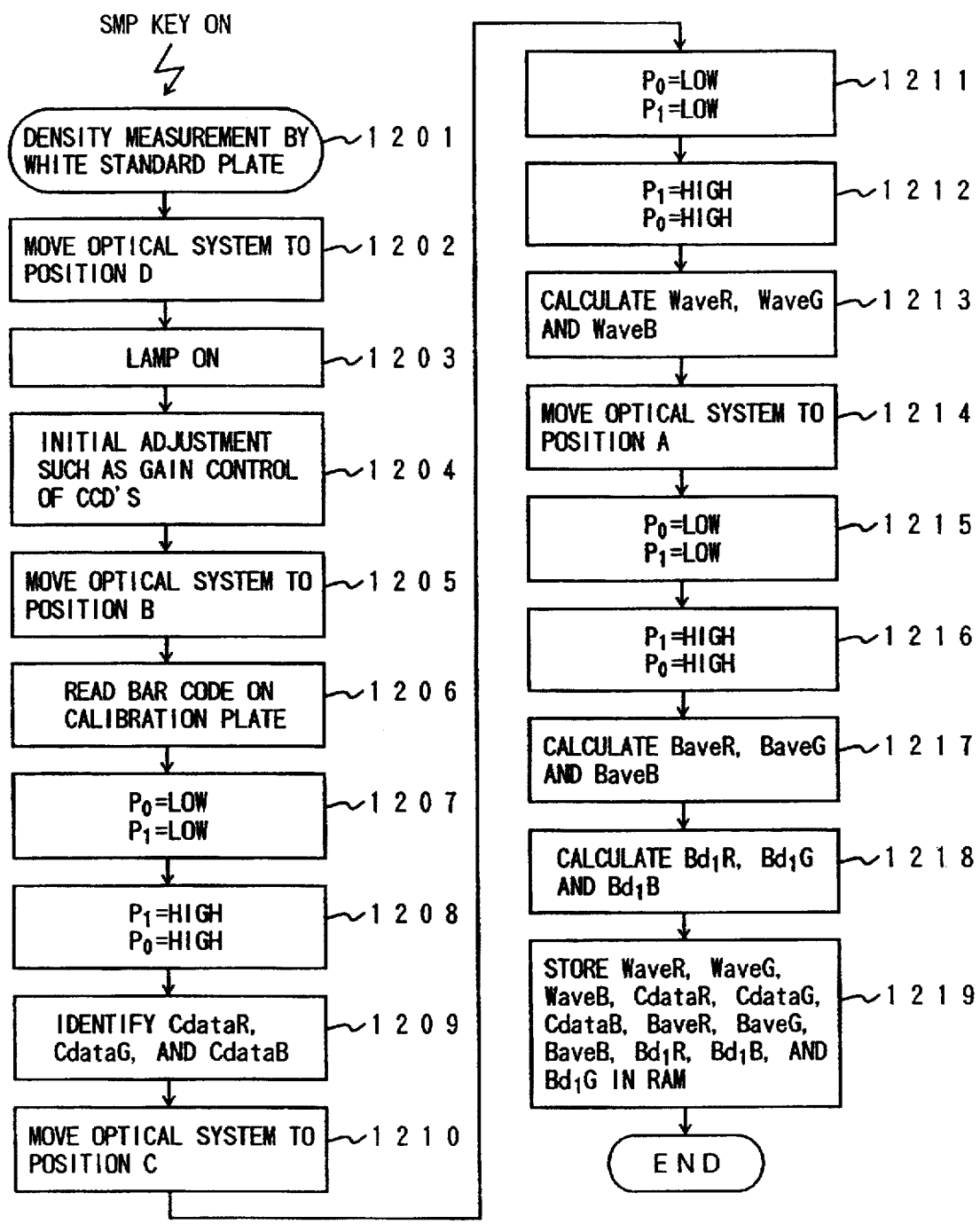
FIG. 8 shows control flow chart of the standard white plate density measurement.

The same measurement as that of the previous embodiment is made for each of the three colors R, G and B. A process thereof is shown in FIG. 8. Suffixes R, G and B of the respective parameters indicate that they are parameters for the respective colors R, G and B.

The process shown in FIG. 8 is basically same as that shown in FIG. 4 except that the recognition of the Cdata in a step 1209, the calculation of Wave in a step 1213, the calculation of Bave in a step 1217 and the calculation of Bdl in a step 1218 are done by the CPU 106 for each of the three colors R, G and B.

In this manner, in the image scanner for reading the color image, the target values of the shading correction by using the standard white plate are determined based on the reading from the calibration plate. Thus, even if the density of the standard white plate is not proper by some reason, satisfactory shading correction is attained for the three colors R, G and B.

In the above embodiments, the density of the calibration plate is indicated by the bar code. Alternatively, in an image scanner having an OCR (optical character reader) function, the density may be indicated by characters such as numerals or symbols.

Besides the bar code and the characters, marks inherent to the apparatus may be defined to represent various densities by the marks and the marks may be read to recognize the density of the calibration plate.

In accordance with the present invention, the irregularity of image signal derived by reading the image of the document sheet on the platen is corrected based on the first standard signal derived by reading the first standard member arranged outside of the platen on which the document sheet is mounted, and the correction operation for the irregularity of the image signal is compensated based on the second standard signal derived by reading the second standard member and the density data of the second standard member indicated on the second standard member so that the correction of the irregularity of the image signal is always satisfactorily attained without being affected by the aging and the contamination.

While the present invention has been described in connection with the preferred embodiments thereof, the present invention is not limited to those specific embodiments but various modifications and changes may be made without departing form the scope of the claim.

What is claimed is:

1. An image reading apparatus comprising:
   read means for photo-electrically reading an image;
   moving means for moving a reading position of said read means;
   a first white reference member to be used for the measurement of irregularity of an output signal from said read means;
   a second white reference member on which density data indicating a density of said second white reference member is recorded;

recognizing means for recognizing the density data recorded on said second white reference member based on a density data signal derived by reading the density data using said read means, wherein the reading position is moved to said second white reference member by said moving means;

determining means for determining a density of said first white reference member, based on a value of a first white reference signal derived by reading said first white reference member using said read means, wherein the reading position is moved to said first white reference member by said moving means, and a ratio of a value of the density data recognized by said recognizing means and a value of a second white reference signal derived by reading said second white reference member using said read means;

obtaining means for obtaining a shading correction factor to be used for correcting the irregularity of an image signal derived by reading an image of a document sheet using said read means, based on the value of the first white reference signal and a value of the density determined by said determining means; and shading correction means for correcting the irregularity of the image signal, based on the shading correction factor.

2. An image reading apparatus according to claim 1, wherein said obtaining means obtains, as the shading correction factor, a factor which corrects the value of the first white reference signal to the density of said first white reference member.

3. An image reading apparatus according to claim 1, wherein the density data is recorded on said second white reference member in the form of bar code.

4. An image reading apparatus according to claim 1, wherein said shading correction means corrects the irregularity of the image signal by multiplying the image signal by the shading correction factor.

5. An image reading apparatus according to claim 1, wherein said read means comprises a line sensor having a plurality of photo-sensing elements.

6. An image reading apparatus according to claim 1, wherein said second white reference member is mounted on a platen glass on which the document to be read is mounted.

7. A shading correction method for controlling an image reading apparatus having read means for photo-electrically reading an image, moving means for moving a reading position of the read means, a first white reference member to be used for the measurement of irregularity of an output signal from the read means, and a second white reference member on which density data indicating a density of the second white reference member is recorded, said method comprising:

a recognizing step of recognizing the density data recorded on the second white reference member based on a density data signal derived by reading the density data using the read means, wherein the reading position is moved to the second white reference member by the moving means;

a determining step of determining a density of the first white reference member, based on a value of a first white reference signal derived by reading the first white reference member using the read means, wherein the reading position is moved to the first white reference member by the moving means, and a ratio of the density data recognized in said recognizing step and a value of a second white reference signal derived by reading the second white reference member using the read means;

an obtaining step of obtaining a shading correction factor to be used for correcting the irregularity of an image signal derived by reading an image of a document sheet using the read means, based on the value of the first white reference signal and the density determined in said determining step; and a shading correction step of correcting the irregularity of the image signal based on the shading correction factor.

8. A method according to claim 7, wherein said obtaining step corrects the value of the first white reference signal to the density of the first white reference member.

9. A method according to claim 7, wherein the density data is recorded on said second white reference member in the form of bar code.

* * * * *

UNITED STATES PATENT AND TRADEMARK OFFICE
CERTIFICATE OF CORRECTION

PATENT NO. : 5,802,217

DATED : September 1, 1998

INVENTOR(S) : YASUMICHI SUZUKI, ET AL.

It is certified that error appears in the above-identified patent and that said Letters Patent is hereby corrected as shown below:

ON THE COVER PAGE, at [56], REFERENCES CITED

Under FOREIGN PATENT DOCUMENTS,

"02297533" should read --2-297533--

AT [56], Attorney, Agent or Firm

"Fitzpatrick,Cella, Harper & Scinto" should read
    --Fitzpatrick, Cella, Harper & Scinto--.

COLUMN 2

Line 6, "not" should read --not a--.
    Line 15, "the" (first occurrence) should be deleted.
    Line 16, "proposes" should read --proposed--.
    Line 29, "attain" should read --attains--.
    Line 36, "other" should read --another--.

COLUMN 4

Line 25, "Video." should read --video.--.

UNITED STATES PATENT AND TRADEMARK OFFICE
CERTIFICATE OF CORRECTION

PATENT NO. : 5,802,217

DATED : September 1, 1998

INVENTOR(S) : YASUMICHI SUZUKI, ET AL.

It is certified that error appears in the above-identified patent and that said Letters Patent is hereby corrected as shown below:

COLUMN 6

Line 29, "a substantially a center" should read --to a substantially center--.

Line 34, "2,755 is" should read --2,755, is--.

COLUMN 7

Line 43, "FIG. 7." should read --FIGS. 7A and 7B.--.

COLUMN 8

Line 6, "calculate" should read --calculated--.
    Line 17, "same" should read --the same--.
    Line 55, "form" should read --from-- and
          "claim." should read --claims.--.

Signed and Sealed this

Fourth Day of May, 1999

Attest:

Q. TODD DICKINSON

*Attesting Officer*    *Acting Commissioner of Patents and Trademarks*